No. 895,760. PATENTED AUG. 11, 1908.
R. C. HULL.
SYSTEM OF ELECTRICAL DISTRIBUTION.
APPLICATION FILED JAN. 3, 1908.
3 SHEETS—SHEET 1.
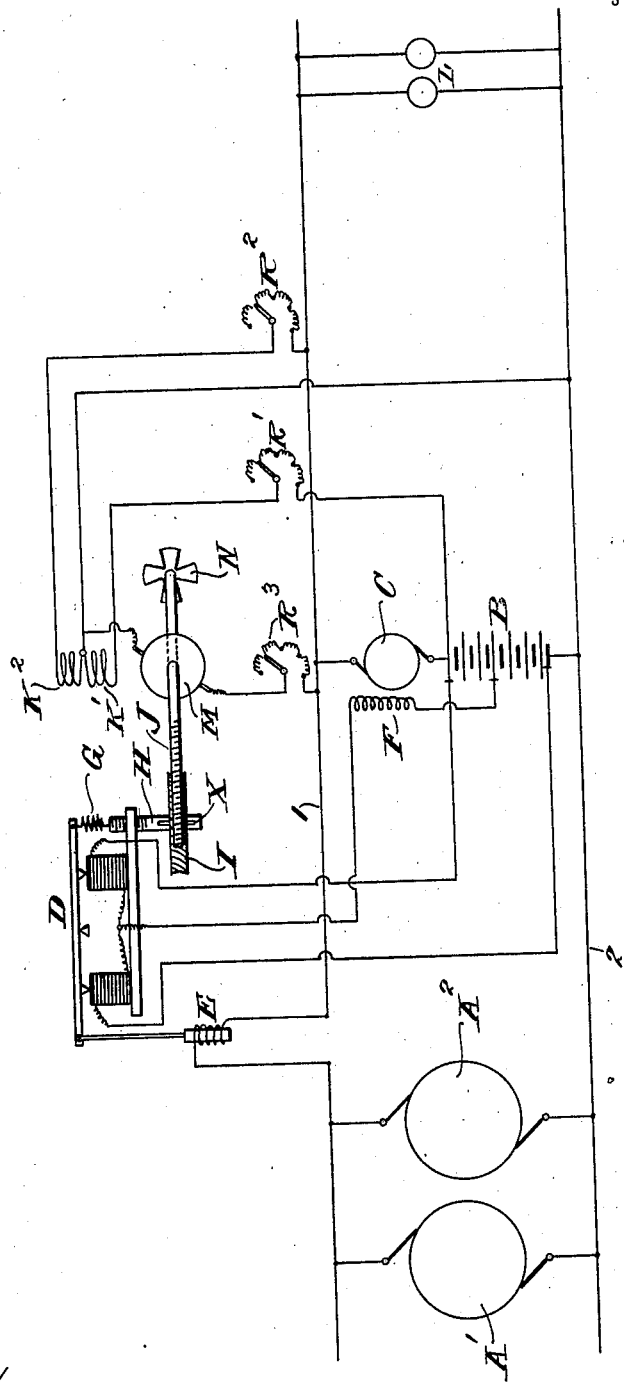
WITNESSES:
INVENTOR.
Robert C. Hull,
BY
ATTORNEY.

No. 895,760. PATENTED AUG. 11, 1908.
R. C. HULL.
SYSTEM OF ELECTRICAL DISTRIBUTION.
APPLICATION FILED JAN. 3, 1908.
3 SHEETS—SHEET 2
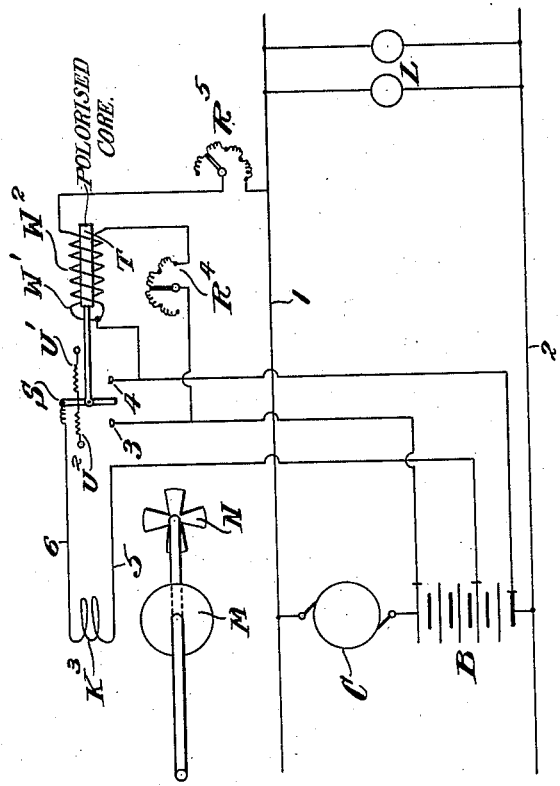
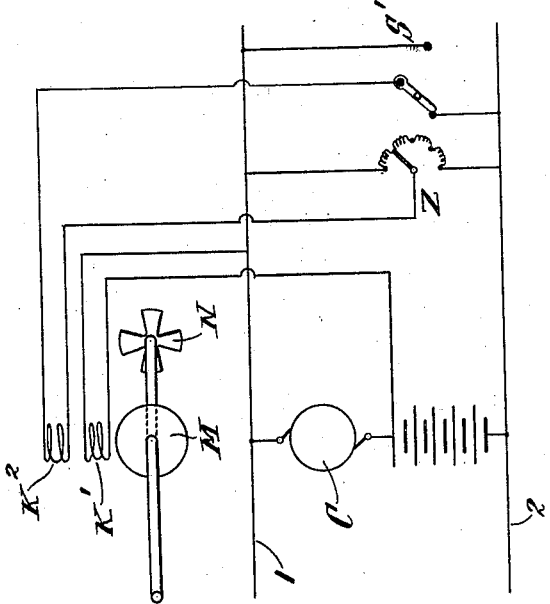
WITNESSES:
INVENTOR.
Robert C. Hull,
BY
Augustus B. Stoughton
ATTORNEY.

No. 895,760. PATENTED AUG. 11, 1908.
R. C. HULL.
SYSTEM OF ELECTRICAL DISTRIBUTION.
APPLICATION FILED JAN. 3, 1908.
3 SHEETS—SHEET 3.
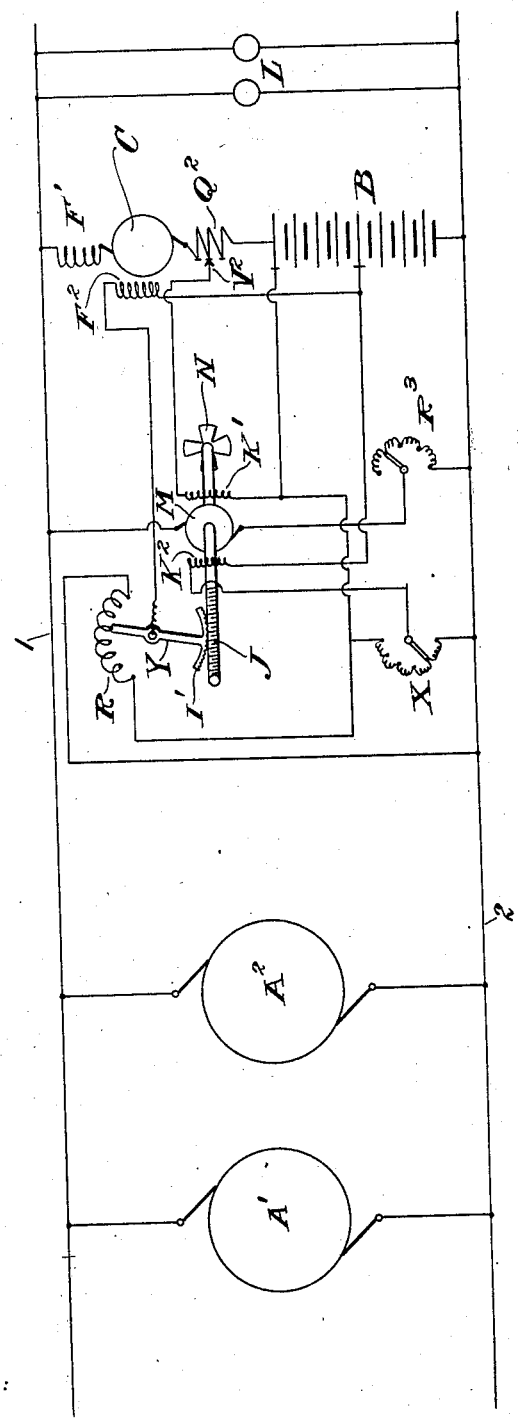
WITNESSES:
INVENTOR.
Robert C. Hull.
BY
Augustus B. Stoughton
ATTORNEY.

UNITED STATES PATENT OFFICE.

ROBERT C. HULL, OF PHILADELPHIA, PENNSYLVANIA.

SYSTEM OF ELECTRICAL DISTRIBUTION.

No. 895,760.

Specification of Letters Patent.   Patented Aug. 11, 1908.

Application filed January 3, 1908.   Serial No. 409,173.

*To all whom it may concern:*

Be it known that I, ROBERT C. HULL, a citizen of the United States, and a resident of Philadelphia, in the county of Philadelphia and State of Pennsylvania, have invented a certain new and useful System of Electrical Distribution, of which the following is a specification.

My invention relates to systems of distribution in which a storage battery is employed for regulating the fluctuations of an intermittent load and the invention is more particularly applicable to systems in which the average load varies over a considerable range within comparatively short intervals of time.

Regulating devices for controlling the operation of storage batteries to cause them to automatically take care of momentary fluctuations of load, as heretofore designed, operate to throw practically all of the fluctuations of load, above or below a predetermined amount, on the battery. Such apparatus does not discriminate between those fluctuations which are of short duration and those which are sustained for longer periods of time. In many cases it is desirable to throw the momentary fluctuations on the battery whereas the sustained changes of load could readily be handled by the generating units provided the change in load on these units were brought about gradually.

One of the principal objects of my invention is to accomplish this latter result, that is, to cause the regulating apparatus which controls the battery to so operate that while the sudden fluctuations are thrown on the battery any sustained changes in the average load may be gradually transferred to the generating units in such a manner as not to disturb their operation.

The nature, characteristic features and scope of my invention will be more clearly understood by reference to the following description taken in connection with the accompanying drawings, in which Figure 1, is a diagram of a system of distribution embodying the invention. Fig. 2, shows a modification in the connections of certain parts of the apparatus shown in Fig. 1. Fig. 3, shows another modification of certain parts of the apparatus shown in Fig. 1, and Fig. 4, illustrates the invention applied to a modified form of controlling apparatus.

Referring to Fig. 1, $A^1$ and $A^2$, are generators supplying current to the circuit 1, 2, to which translating devices L, are connected, it being understood that these latter produce a fluctuating load on the circuit 1, 2. A storage battery B, with its booster C, is connected across circuit 1, 2. The field F, of the booster is controlled in response to slight changes of load on the generators by means of the carbon regulator D, whose operation is controlled by the solenoid E, connected into the generator circuit and the spring G, whose tension is controlled by the apparatus to be described below.

The operation of the regulator D, is well known in the art and need not be further described here, except to point out that the load falling on the generators is determined by the tension of the spring G, which must be balanced by the pull produced by the current in the solenoid E in order to produce equilibrium. An increase in tension in the spring G, will therefore cause a corresponding increase in the current on generators and vice versa.
The tension of the spring G, is controlled by a screw H which may be turned in either direction by the motor M to which the screw is connected by the worm J and the gear wheel I, the latter driving the screw H by means of a spline X.

The armature of the motor M, is connected across the circuit 1, 2, with a rheostat $R^3$, connected in series. The motor is so designed that its maximum counter-electro-motive-force is considerably less than the voltage across the conductors 1, 2, the difference being absorbed in the rheostat $R^3$. In this way a more or less constant current is transmitted to the motor armature, the amount of this current being adjustable by means of the rheostat $R^3$. A fan N, is attached to the motor shaft and acts as a brake, opposing an increasing resistance with increase of speed. The motor M, is provided with two field windings $K^1$ and $K^2$, the former being connected across the battery terminals and the latter across the circuit 1, 2. These two fields are differentially wound so that when their excitations are equal the field strength will be zero. The effect of the two fields may be adjusted by the rheostats $R^1$ and $R^2$ respectively.

The operation of this system is then as follows:—If a sudden increase of load occurs at L, the effect of the carbon regulator on the booster C will be such as to cause the battery to discharge and relieve the generators of practically all of the increase. If the load falls off immediately to normal, the battery current will again drop to zero since the motor N, will not have had time to produce any effect on the spring G. As soon as the battery begins to discharge its voltage will fall below that of the circuit 1, 2. This will destroy the balance between the two fields $K^1$ and $K^2$ and produce a net field strength which in connection with the current in the motor armature will tend to drive the motor in the direction to increase the tension on the spring G, thus causing the generators to take an increased load and relieve the battery of a portion of its discharge. By reason of the reduction of speed effected by the worm and gear it will require some appreciable time for the motor M to produce any appreciable change in the load on the generators. This time lag will depend upon the speed of the motor as well as upon the ratio of the worm and gear, and the motor speed may be adjusted in several different ways. The torque developed by the motor will depend upon the field strength and the current in its armature. The resistance offered by the fan N will depend upon the design of this fan and will vary with the speed. The motor will tend to speed up until there is a balance between the torque which it is developing and the resistance offered by the fan and the gearing. The speed at which this balance is reached will therefore depend upon the design of the fan and also on the field strength and the current in the motor armature. These latter two factors may be adjusted by means of the rheostats $R^1$, $R^2$, and $R^3$.

In Fig. 2, is shown a different method of connecting the fields $K^1$ and $K^2$ of the motor M. In this diagram the field $K^1$ is connected between the conductor 1 and the corresponding battery terminal, and the current in this field is therefore determined by the difference in voltage between the battery and the circuit 1, 2. The field $K^2$ is connected at one terminal to a double throw switch $S^1$, by which it may be connected to either conductor 1 or conductor 2, and at the other terminal to the arm of a rheostat Z, which rheostat is connected across the circuit 1, 2. The voltage applied to the field $K^2$, may therefore be made anything from zero to the maximum in either direction. If the voltage across the field $K^2$ is zero, the operation of the motor M, will be to gradually bring the battery to a condition in which its voltage is equal to that of the circuit 1, 2. By means of the field $K^2$, however, an average difference of voltage may be produced in either direction, depending upon the direction of current in this latter field. This will permit an adjustment either for a floating condition of the battery or for a net charge or discharge.

In Fig. 3, another modification of the invention is shown, in which only one winding $K^3$, is provided for the motor M. This field winding is connected at one terminal by means of conductor 5, to the middle point of the battery. The other terminal is connected by means of conductor 6, to a switch S, by means of which contact may be made with either terminal of the battery depending upon whether the arm of the switch is in contact with point 3, or point 4. Normally the arm of this switch is held in a middle position, out of contact with either point, by means of the opposing springs $U^1$ and $U^2$. In this position there will be no current in the field $K^3$, and the motor M will not operate. The arm of the switch S, however, may be thrown one way or the other by means of the electro-magnet T, whose core is permanently magnetized (or may be polarized in a suitable manner) and is acted upon by two windings $W^1$ and $W^2$. These two windings are connected respectively across the circuit 1, 2, and across the battery terminals, and their effect may be adjusted by means of the rheostats $R^4$ and $R^5$. These windings are differentially wound and when their effect is equalized the switch S, will remain in its mean position. If, however, the battery is caused to discharge and its voltage drops the effect of the winding $W^2$ will be decreased and the winding $W^1$ will predominate, the result being to remove the arm of the switch S, into contact with one of the points, for example point 3. This will excite the field winding $K^3$, in the direction to throw increased load on the generators as described in connection with Fig. 1. If the battery voltage should rise, due to its receiving a charge as a result of a decrease in the load at L, the coil $W^2$, will predominate and the switch S, will be pulled into contact with point 4, which will reverse the direction of the current in the field winding $K^3$, driving the motor in the opposite direction and relieving the generators of a part of their load.

In Fig. 4, the invention is applied to a modified form of booster control. In this figure the voltage of the booster C, is controlled by two field coils $F^1$ and $F^2$. The coil $F^1$, is connected in series between conductor 1 and the booster, and is designed to compensate for battery drop. It is understood that this method of booster control may be used where the characteristic of the system at the point where the battery is installed is decidedly drooping, as for example, where the battery is connected to the circuit at a considerable distance from the source of current by conductors having appreciable resistance. The field $F^2$, of the booster is connected at one terminal to the middle point of the battery and at the other terminal to the arm Y of the rheostat R, this latter being connected directly across the battery terminals. By adjusting the position of the arm Y the current in the field $F^2$, may be varied from zero to a maximum in either direction. The arm Y is controlled by the motor M, by means of the worm J and the gear $I^1$. The motor M, operates in general in the same manner as described in connection with the previous figures, but its field $K^1$, is in this case controlled by variations of battery current instead of battery voltage. For this purpose this field is connected across a shunt $Q^2$ in series with the battery. The amount of this shunt included between the terminals of the field $K^1$ may be adjusted by the movable contact $V^2$. A second field $K^2$, on the motor M, is also shown connected at one terminal to the middle point of the battery and at the other terminal to the rheostat X, whereby the effect of this field may be varied from zero to the maximum in either direction. If the field $K^2$ is adjusted for zero excitation any flow of current to or from the battery will be partially diverted through the field $K^1$ and will operate the motor M to move the rheostat arm Y in such a direction as to vary the effect of the field $F^2$ of the booster to counteract the effect of field $F^1$ and tend to restore the battery current to zero.

If the field $K^2$ is adjusted for some other excitation than zero its effect will be balanced by some value of current in the field $K^1$ and therefore for some value of current to or from the battery, and any departure of the battery current from this value will operate the motor M, in such a way as to tend to restore this current value. Thus with the field $K^1$ only the motor M will tend to bring the battery current to zero whereas by adjusting the field $K^2$ the motor M will tend to bring the battery current to some fixed value of charge or discharge and a net average charge or discharge of the battery may thus be brought about. If the motor M, responds to change of battery condition, that is, to changes of either battery voltage or battery current it follows that at some particular state of the battery, that is, at some particular voltage or some particular value of charge or discharge, the field strength of the motor M, may be adjusted to zero. Any change in the battery condition from this predetermined point, if of sufficient magnitude, will put the motor in operation in the direction to restore the battery condition to the predetermined point for which the adjustment has been made. This change, however, will be gradual and this time element may be adjusted by means of the devices shown and described.

What I claim is:

1. In combination, an electric circuit, and its source, a variable load supplied from the circuit, a storage battery operatively arranged to deliver and receive energy to and from the circuit, regulating apparatus adapted to cause the battery to charge and discharge and responsive to departures from a certain electrical condition of the circuit, and a device responsive to changes of the battery condition for controlling the regulating apparatus with respect to the particular electrical condition to departures from which it is responsive.

2. In combination a storage battery, regulating means for causing the battery to charge and discharge and other slower acting automatic means adapted to counteract the first.

3. In combination a storage battery, and controlling apparatus responsive to variations from a predetermined battery condition and adapted to restore said condition.

4. In combination a storage battery, controlling apparatus responsive to variations from a predetermined battery condition and adapted to restore said condition, and means for controlling the time required by said apparatus to produce a given effect.

5. In combination a storage battery, regulating means for causing the battery to charge and discharge and other slower acting means responsive to variations of the battery condition and adapted to counteract the first.

6. In combination a storage battery, regulating means for causing the battery to charge and discharge, and other slower acting means responsive to the effects produced by the first and adapted to counteract them.

7. In combination a storage battery, regulating means for causing the battery to charge and discharge, other slower acting means responsive to the effects produced by the first and adapted to counteract them, and means for controlling the time required by the second means for producing a given effect.

8. In combination an electric circuit, a storage battery, means responsive to changes in the electrical condition of the circuit for causing the battery to deliver and receive energy to and from the circuit, and other slower acting means responsive to the effects produced by the first and adapted to counteract them.

9. In combination an electrical circuit, a storage battery operatively arranged in respect to the circuit, automatic means for controlling the battery charge and discharge, and other slower acting means responsive to changes in battery condition and adapted to counteract the effects of the first.

10. In combination a storage battery, means for controlling the battery charge and discharge, and other slower acting automatic means adapted to counteract the effects of the first.

11. In combination a storage battery controlling apparatus responsive to departures from a predetermined battery condition and adapted to restore said condition, and means for adjusting said controlling apparatus in respect to the particular battery condition to departures from which it is responsive.

12. In combination a storage battery, electro-responsive means for controlling the battery charge and discharge, other slower acting means responsive to departures from a predetermined battery condition and adapted to restore that condition, and means for adjusting the latter means in respect to the particular battery condition to departures from which it is responsive.

13. An electric circuit, a storage battery in operative relation to the circuit, means responsive to departures from a certain electrical condition of the circuit for controlling the charge and discharge of the battery, a device responsive to departures from a certain battery condition for varying the first mentioned means with respect to the particular circuit condition to departures from which it is responsive, and means for adjusting the latter device with respect to the particular battery condition to departures from which it is responsive.

14. In combination an electric circuit and its source, a storage battery operatively arranged to deliver and receive energy to and from the circuit, electro-responsive apparatus for controlling the battery charge and discharge, means adapted to counteract the effects of the controlling apparatus, an electric motor for operating the counteracting means, and a field winding on the motor responsive to changes of battery voltage.

15. A system of distribution including a generator and a storage battery and provided with automatic regulating apparatus responsive to charges of electrical condition and adapted to discriminate between rapid fluctuations from an average load and sustained changes in the average load, whereby rapid fluctuations from any average load are referred to the battery and sustained changes in the average load are referred to the generator, substantially as described.

16. A system of electrical distribution provided with an automatic regulating apparatus responsive to rapid fluctuations from any average load and also to sustained changes constituting a different average load, and including a storage battery operatively arranged to receive the rapid fluctuations, and a generator operatively arranged to receive the sustained changes, substantially as described.

In testimony whereof I have hereunto signed my name.

ROBERT C. HULL.

Witnesses:
W. J. JACKSON,
FRANK E. FRENCH.